(12) United States Patent
Szczepanski

(10) Patent No.: US 9,115,627 B2
(45) Date of Patent: Aug. 25, 2015

(54) MULTIPLE SKEWED CHANNEL BRICKS MOUNTED IN OPPOSING CLOCKING DIRECTIONS

(75) Inventor: Edward Szczepanski, Grosse Pointe Woods, MI (US)

(73) Assignee: DENSO International America, Inc., Southfield, MI (US)

( * ) Notice: Subject to any disclaimer, the term of this patent is extended or adjusted under 35 U.S.C. 154(b) by 161 days.

(21) Appl. No.: 13/542,796

(22) Filed: Jul. 6, 2012

(65) Prior Publication Data

US 2014/0007563 A1    Jan. 9, 2014

(51) Int. Cl.
*F01N 3/10* (2006.01)
*F01N 3/28* (2006.01)
*F01N 13/00* (2010.01)

(52) U.S. Cl.
CPC .......... *F01N 3/2825* (2013.01); *F01N 13/0093* (2014.06); *F01N 13/0097* (2014.06); *F01N 2330/06* (2013.01); *F01N 2330/38* (2013.01)

(58) Field of Classification Search
USPC ............ 60/274, 297, 299, 300; 422/169, 171, 422/174, 177, 179, 180
See application file for complete search history.

(56) References Cited

U.S. PATENT DOCUMENTS

| | | | | |
|---|---|---|---|---|
| 5,693,295 A | * | 12/1997 | Foster | 422/180 |
| 6,274,106 B1 | * | 8/2001 | Held | 423/213.2 |
| 6,311,485 B1 | * | 11/2001 | Becker et al. | 60/324 |
| 6,531,099 B1 | * | 3/2003 | Held | 422/171 |
| 7,276,295 B2 | * | 10/2007 | Mangold et al. | 428/593 |
| 8,057,746 B2 | * | 11/2011 | Matsuoka | 422/171 |

FOREIGN PATENT DOCUMENTS

JP    S5681135 A    7/1981

* cited by examiner

*Primary Examiner* — Binh Q Tran
(74) *Attorney, Agent, or Firm* — Harness, Dickey & Pierce, P.L.C.

(57) ABSTRACT

A catalytic converter for use in motor vehicle exhaust systems includes a housing and a catalytic substrate disposed in the housing. The housing includes a central shell fixed to an inlet end cone and an outlet end cone. The catalytic substrate includes a primary body section is disposed in an internal chamber and has a plurality of skewed flow channels through which the hot exhaust gas flows. The skewed flow channels create turbulent flow to assist in improved light-off and improved purification efficiency.

26 Claims, 4 Drawing Sheets

MULTIPLE SKEWED CHANNEL BRICKS MOUNTED IN OPPOSING CLOCKING DIRECTIONS

FIELD

The present disclosure relates generally to automotive catalytic converters. More particularly, the present disclosure pertains to catalytic converters having one or more catalytic substrate bricks with skewed exhaust flow channels.

BACKGROUND

The statements in this section merely provide background information related to the present disclosure and may not constitute prior art.

Catalytic converters are used in motor vehicles to react with and purify the hot exhaust gases discharged from an internal combustion engine. The catalytic converter typically includes a substrate, often constructed of an extruded ceramic material, having flow channels or other flow conduits, such as honeycombs, for the passage of the hot exhaust gases. The ceramic substrate can be loaded with a catalyst which functions to purify the hydrocarbons (HC), carbon monoxide (CO) and nitric oxide ($NO_x$) in the exhaust gases through a catalytic reaction process.

The catalytic converter can also include a housing having a central chamber, an inlet for receiving the hot exhaust gases, and an outlet for exhausting the purified gases. In most applications, the catalytic substrate is positioned within the control chamber for performing the gas purifying function. A support member, such as a mat or wire mesh, is often wrapped around the substrate for supporting the catalytic substrate with respect to the housing. The support member can be placed between the catalytic substrate and the housing and exert a radially-directed load to inhibit movement of the catalytic substrate and absorb shock. In some catalytic converters, laterally-spaced seal members can be disposed at opposite ends of the catalytic substrate, adjacent to the inlet and outlet ends of the control chamber, to reduce leakage of untreated exhaust gases and compensate for surface irregularities on or between the catalytic substrate and/or the chamber caused by flexibility of the support member.

Typical catalytic converters include one or more "bricks" of a catalytic substrate having planar front and rear face surfaces with a plurality of straight exhaust flow channels extending therebetween. Such straight exhaust flow channels tend to result in laminar flow conditions which can detrimentally impact the mass transfer characteristic and ultimately the overall efficiency of the catalytic converter. Thus, it is understood that increased turbulence generated in the exhaust gases flowing through the flow channels can be effective in increasing the mass transfer rate and the overall efficiency of the catalytic converter.

A significant portion of the undesirable emissions exhausted from a vehicle's internal combustion engine occurs during the first few minutes of engine operation following a cold start. This is due to the fact that the catalytic converter is not optimally functional until the catalytic substrate reaches its working temperature, commonly referred to as achieving "light-off" In view of stricter emissions regulations, it is critical to reduce the time it takes the catalytic converter to reach its working temperature.

Accordingly, a need exists for development of catalytic converters having quicker light-off characteristics and enhanced flow patterns through the catalytic substrate.

SUMMARY

This section provides a general summary of the present disclosure, and is not a comprehensive disclosure of its full scope or all of its features and advantages.

It is an aspect of the present disclosure to provide a catalytic converter having a catalytic substrate including a ceramic substrate brick with "skewed" exhaust flow channels configured to have their length slanted, twisted, rotated or held to a specified optimum theta (docking direction) so that stronger turbulence and a more controlled exhaust flow pattern is created as the exhaust gases flow through the non-linear flow channels. Accordingly, by guiding the exhaust gases through the skewed flow channels, the exhaust flow will generate greater catalyzing activity along at least one side-wall of the flow channels while the opposite side-wall will see less catalyzing activity. As a result, targeted location of the catalyst material can be directed to the side-wall portions of the flow channels having the most contact with the exhaust gases.

It is another aspect of the present disclosure to provide a catalytic converter equipped with at least two catalytic substrate bricks each having skewed exhaust flow channels. The first and second bricks can be abutted and mounted in a reverse orientation to generate a radical redirection of the non-linear exhaust flow channels to create increased turbulence and gas churning upon flow of the exhaust gases therethrough.

Accordingly, a catalytic converter of the present disclosure may include a catalytic substrate having at least one skewed exhaust flow channel configured to create turbulent flow and route the exhaust gas into contact with the catalyst-coated side-walls. The skewed exhaust flow channel has an inlet and an outlet and a length that is at least partly non-linear.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected exemplary embodiments and are not intended to limit the scope of the present disclosure in any way. Similar or identical elements are given consistent reference numerals throughout the various figures.

The present disclosure will become more fully understood from the detailed description and the accompanying drawings wherein.

DETAILED DESCRIPTION

The following exemplary embodiments are provide so that the present disclosure will be thorough and fully convey the scope of those skilled in the art. Numerous specific details are set forth such as examples of specific components, devices and schematic configurations to provide a thorough understanding of exemplary embodiments of the present disclosure. However, it will be apparent to those skilled in the art that these specific details need not be employed, that the exemplary embodiments may be embodied in many different forms, and that neither should be construed to limit the scope of the present disclosure.

Figure 1:
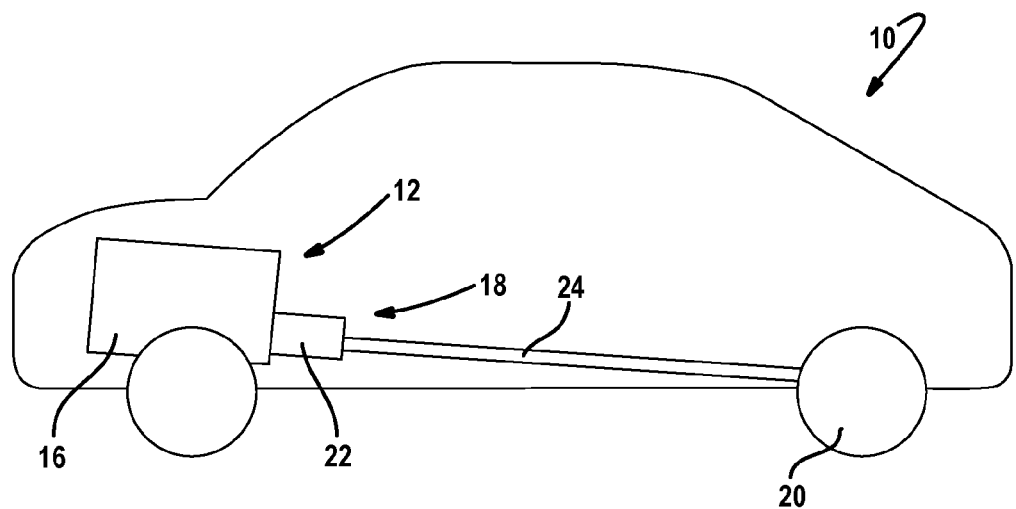
FIG. 1 is a schematic of a motor vehicle equipped with a powertrain and exhaust system constructed in accordance with the present teachings.
Figure 2:
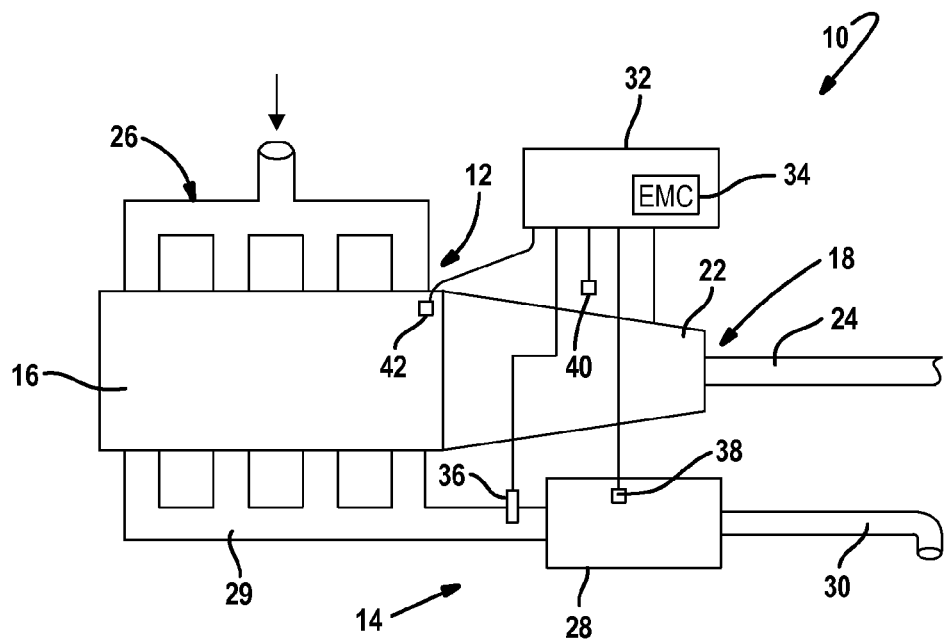
FIG. 2 is a schematic illustration of the powertrain and the exhaust system associated with the motor vehicle of FIG. 1.

Referring primarily to FIGS. 1 and 2, an exemplary motor vehicle 10 is schematically shown to include a powertrain 12 and an exhaust system 14. The powertrain 12 includes an internal combustion engine 16 and a drivetrain 18 that are configured to generate and transmit drive torque to a set of drive wheels 20. The drivetrain 18 can include a transmission 22, an axle assembly (not shown) driving the wheels 20, and a propshaft 24 interconnecting an output of the transmission 22 to an input of the axle assembly. The internal combustion engine 16 can be provided with an air intake system 26 and the exhaust system 14 can include a catalytic converter 28 having an inlet adapted to receive exhaust gases from an exhaust manifold 29 of the engine 16 and an outlet adapted to discharge the treated gases to a tail pipe 30. The catalytic converter 28 is adapted to purify the hot exhaust gases generated by the engine 16 via a catalytic conversion process. The converted or purified gases are exhausted through the tail pipe 30. The motor vehicle 10 can further include a control system 32 having an engine management controller 34 that is responsive to various sensors including, for example, a lambda probe 36, a catalytic converter temperature sensor 38, an ambient temperature sensor 40, and a crankshaft sensor 42. In accordance with an exemplary embodiment, the control system 32 is adapted to control engine operating parameters such as, for example, the ignition timing and operation of the fuel injection system.

Figure 3:
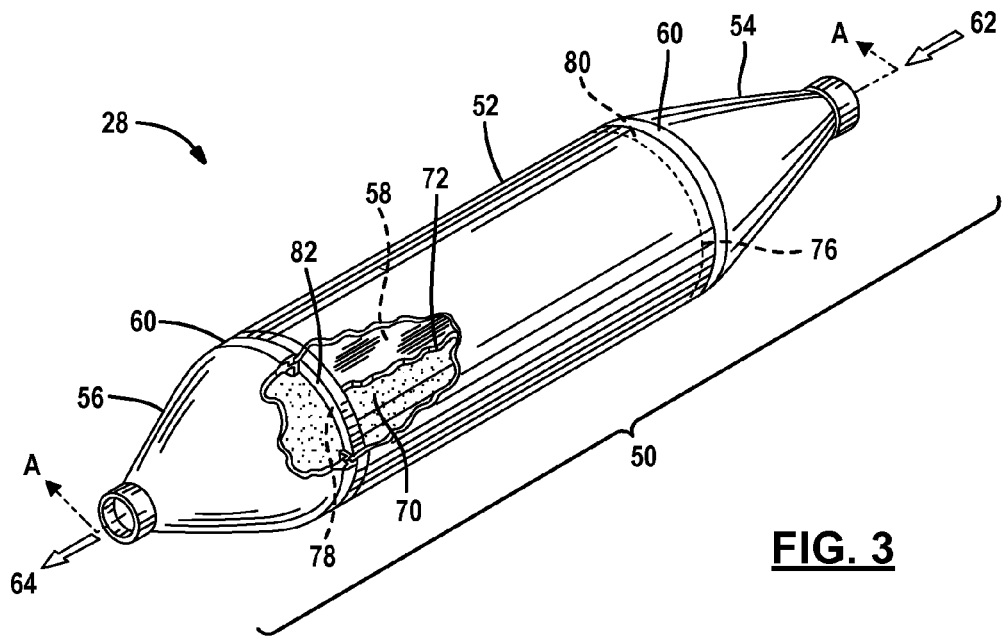
FIG. 3 is a perspective view of a catalytic converter constructed in accordance with the present invention.
Figure 4:
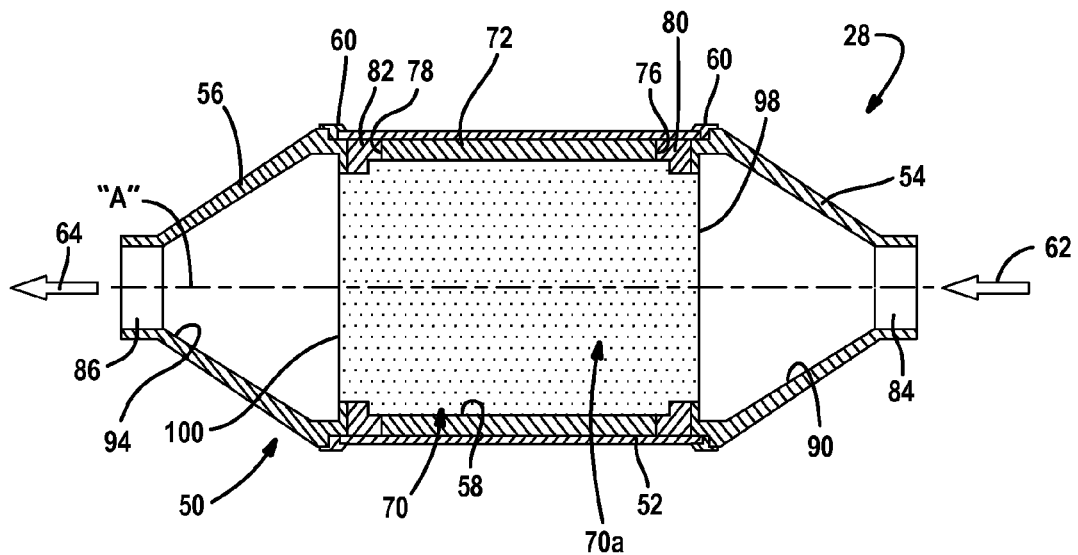
FIG. 4 is a sectional view of a catalytic converter according to a first exemplary embodiment of the present invention taken generally along A-A of FIG. 3.

Referring to FIGS. 3 and 4, a first exemplary embodiment of the catalytic converter 28 constructed in accordance with the present teachings will now be described in detail. The catalytic converter 28 can include an elongated housing 50 that can be fabricated from a sheet metal material suitable for use with hot exhaust gases and which is resistant to under-car salt and corrosion. The elongated housing 50 can include multiple sections which may be fixed (i.e., welded or riveted) together. The elongated housing 50 can include a shell 52, an inlet end cone 54 and an outlet end cone 56. In a non-limiting example, the shell 52 is shown to be generally cylindrical in shape and having a generally circular cross-section. However, it should be understood that the shell 52 can have other cross-sectional shapes, such as generally rectangular, square or oval cross-sections for use in the catalytic function.

Shell 20 defines an internal central chamber 58. The inlet and outlet end cones 54 and 56 are generally conical in shape and have a generally circular cross-section of varying diameters. It should also be understood that the end cones may have other cross-sectional shapes. Each of the end cones 54 and 56 can taper from a first larger edge perimeter to a second smaller edge perimeter. A portion of each end cone adjacent to the first larger edge perimeter is attached to a peripheral edge of the elongated shell 52 in suitable manner, for example, by welding. A bead of welding material 60 is shown applied to the end cones 54 and 56 and the shell 52 for rigidly attaching the housing components, thereby forming the multi-piece housing 50. Although not shown, inlet and outlet exhaust pipes are connected to the second smaller edge perimeters of the inlet and outlet end cones 54 and 56, respectively, to form a portion of the exhaust system 12. Hot exhaust gases may be supplied from the engine 16 to the inlet end cone 54 in a direction represented by an arrow 62 and enter the internal chamber 58. Purified gases are subsequently exhausted from the internal chamber 58 through the outlet end cone 56 in a direction represented by an arrow 64.

A catalyst-coated substrate 70 is located within the internal chamber 58 of the elongated housing 50. It should be understood that one or more segments or "bricks" of the catalytic substrate 70 can be disposed axially within the chamber 58. The catalytic substrate 70 can be formed from a ceramic material impregnated or loaded with a catalyst material for performing the catalytic function in any suitable known manner when hot exhaust gases pass through a series of flow channels formed in the catalytic substrate 70 while flowing from the inlet end cone 54 to the outlet end cone 56.

The catalytic substrate 70 is positioned and secured within the internal central chamber 58 by a support mat 72 which is disposed within the internal chamber 58 between an inner surface of the shell 52 and an outer surface of the catalytic substrate 70. The support mat 72 prevents movement and provides support to the catalytic substrate 70 within the central chamber 58, most notably in the radial direction. The support mat 72 can be formed from an intumescent material which typically swells when exposed to hot gases so that the space between the outer surface of the catalytic substrate 70 and the inner surface of the shell 52 is occupied during operation of the catalytic converter 28. The support mat 72 can also be formed from a non-intumescent material or a wire mesh material. In other embodiments, the support mat 72 can be omitted so that a gap is formed between the facing surfaces of the catalytic substrate 70 and the shell 52. The support mat 72 can include a leading edge 76 adjacent to the inlet end cone 54 and a trailing edge 78 adjacent to the outlet end cone 56. Annular support seals 80 and 82 can also be provided between the leading edge 76 and the trailing edge 78 of the support mat 72 to provide enhanced support while restricting both radial and axial movement of the catalytic substrate 70.

Typically, the flow path upstream of the catalytic converter 28 is defined by a tube or pipe having a cross-sectional area that is substantially smaller than the cross-sectional area of the inlet end cone 54 and the internal chamber 58 within the shell 52. It can be seen from FIG. 4 that an inlet port 84 defined by the inlet end cone 54 and an outlet port 86 defined by the outlet end cone 56 are aligned along a common axis "A" and that the catalytic converter 28 is generally symmetrical relative thereto. However, this is merely illustrated as a design choice and it is to be understood that the inlet port 84 may be offset radially and/or laterally relative to the outlet port 86.

Figure 5:
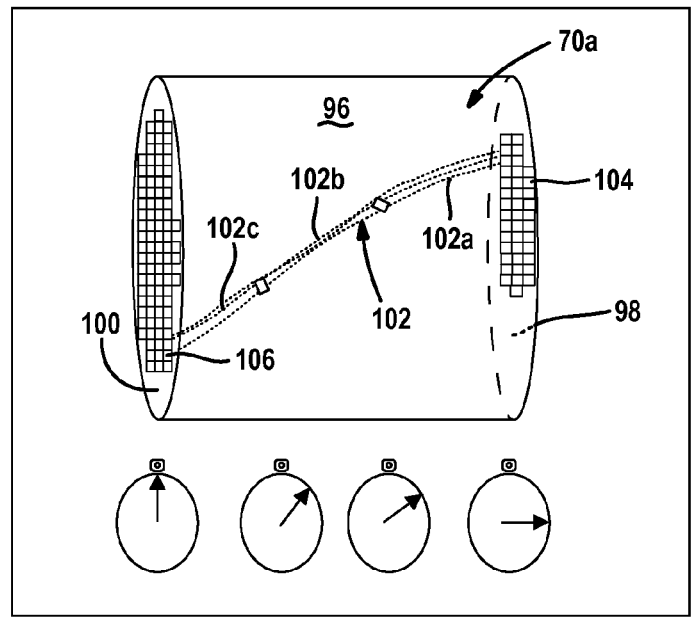
FIG. 5 is a side view of the catalytic substrate brick associated with the catalytic converter of FIGS. 3 and 4 illustrating a skewed flow channel.

Referring to FIG. 5 in addition to FIG. 4, a first exemplary embodiment of a catalytic substrate configured as a single brick 70a will now be described. The brick 70a includes a body section 96 disposed within the internal chamber 58. The body section 96 is cylindrical and is supported by the mat 72 and includes a planar inlet face surface 98 and a planar outlet face surface 100. A plurality of exhaust gas flow channels 102 are formed in brick 70a and extend between the inlet face surface 98 and the outlet face surface 100. The untreated exhaust gases within the inlet chamber 90 initially contact the inlet face surface 98 and are directed into the inlet 104 of each of the flow channels 102. As the exhaust gas flows through the flow channels 102, it contacts the catalyst-treated side-walls of the flow channels 102 before being discharged through the outlets 106 into the outlet chamber 94. The treated gases are discharged through the outlet port 86 to the tail pipe 30.

In accordance with specific aspects of the present disclosures, the flow channels 102 are formed to be non-linear between their inlets 104 and outlets 106. In particular, the term "skewed" will hereafter be used to describe and define the non-linear properties of the flow channels 102 and is intended to encompass configurations of the flow channels 102 that are rotated, indexed, clocked, twisted, slanted, obliquely-aligned and/or angulated, either partially or completely, along their length and which have a central flow axis that is not parallel to and/or concentric with axis "A" of the catalytic converter 28. One purpose of the skewed flow channels 102 is to generate stronger turbulence and a more controlled exhaust flow by spinning the exhaust gases. Another purpose is to allow use of "target" positioning of the catalyzing material along the side-walls of the flow channels 102 where the greater surface contact occurs.

FIG. 5 illustrates the substrate brick 70a removed from the catalytic converter 28 and having at least one skewed flow channel 102 having an inlet 104 and an outlet 106. From the illustration, it is clear that a plurality of inlets 104 are associated with the inlet face surface 98 which communicate with a plurality of outlets 106 associated with the outlet face surface 100 via a series of exhaust flow channels. While not specifically shown, those skilled in the art will appreciate that these additional flow channels can also be skewed and may, for example, be similarly configured to the single exemplary flow channel 102 shown.

The flow channel 102 is shown in FIG. 5 to include at least three segments, identified as a first or inlet segment 102a, a second or intermediate segment 102b, and a third or outlet segment 102c. FIG. 5 also includes a clock face to clearly illustrate the indexing or counter clockwise rotation of the flow channel 102 between the inlet face surface 98 and the outlet face surface 100. In accordance with a first exemplary embodiment, the three segments of the flow channel 102 are continuous along a common arcuate path to define a rotational clocking between the inlet 104 and the outlet 106 in a non-limiting range of 1° to 90°. For example, if the total rotational indexing is 90°, then each of the segments can be rotationally indexed 30°. Optionally, each of the channel segments can be rotationally indexed through different angular ranges to provide distinct arcuate segments which can facilitate greater turbulence in a particular one of the distinct channel segments. In this scenario, the inlet segment 102a may be configured to generate the greatest turbulence for improved light-off characteristic or, alternatively, the outlet segment 102c can be configured for greatest turbulence for improved efficiency. According to another optional configuration, one of the segments, such as the intermediate segment 102b, can be configured as a linear flow channel which interconnects the rotationally indexed inlet and outlet segments.

Figure 6:
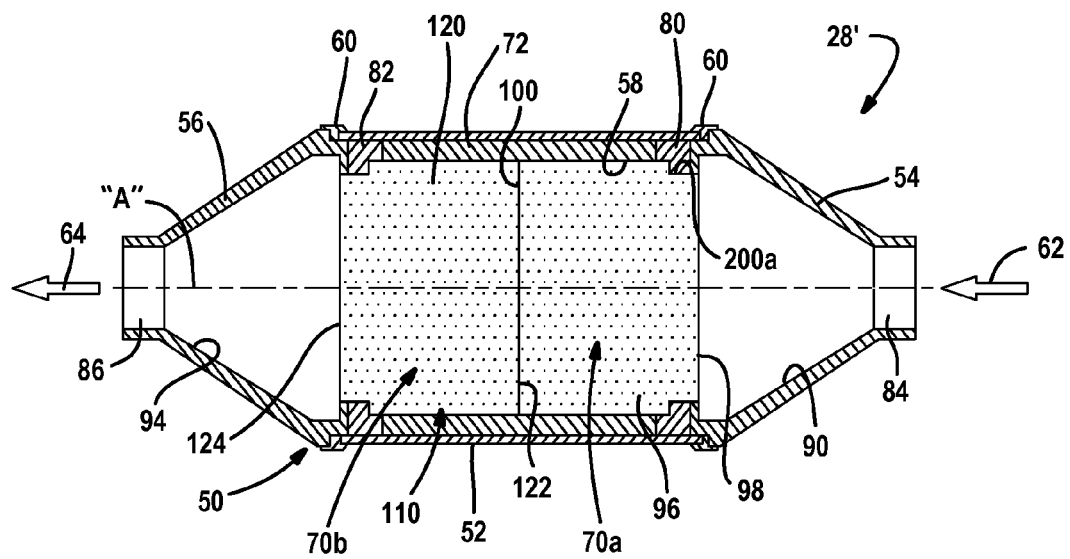
FIG. 6 is a sectional view of a catalytic converter according to a second exemplary embodiment of the present invention.
Figure 7:
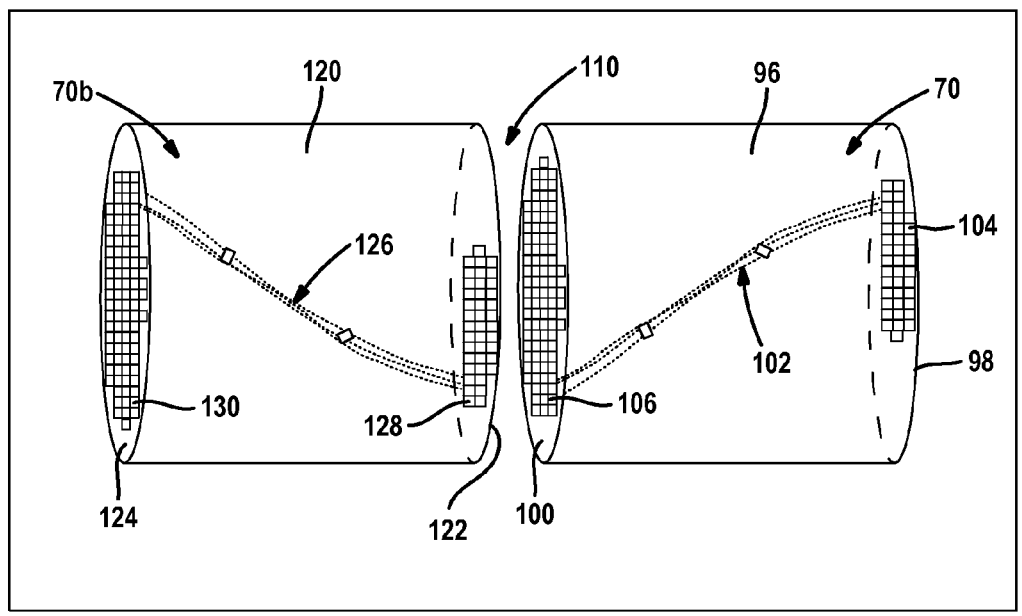
FIG. 7 is a side view of the first and second catalytic substrate bricks associated with the catalytic converter of FIG. 6 and illustrating the orientation of the facing skewed flow channels.

Referring now to FIGS. 6 and 7, another embodiment of a catalytic converter 28' is shown to include a catalytic substrate assembly 110 comprised of a first brick 70a and a second brick 70b that are both supported by the support member 72 within the internal chamber 58 of the shell housing 52. The first brick 70a can be similar to brick 70a of HG. 5 and include a planar inlet face surface 98, a planar outlet face surface 100, and a plurality of exhaust gas flow channels 102. The flow channels 102 each define an inlet 104 in the inlet face surface 98 and an outlet 106 in the outlet face surface 100. In accordance with the previously disclosed aspects of the present disclosure, one or more of the flow channels 102 can be skewed to provide a non-linear passage for the exhaust gases flowing through the first brick 70a.

The second brick 70b includes a cylindrical body section 120 having a planar inlet face surface 122, a planar outlet face surface 124, and a plurality of exhaust gas flow channels 126. The flow channels 126 each define an inlet 128 in the inlet face surface 122 and an outlet 130 in the outlet face surface 124. The flow channels 126 are configured to be skewed in a manner generally similar to the flow channels 102 formed through the first brick 70a.

As shown in FIG. 6, the outlet face surface 100 of the first brick 70a is aligned to abut against the inlet face surface 122 of the second brick 70b such that the outlet 106 of each flow channel 102 is aligned to communicate with the inlet 128 of a corresponding flow channel 126. It is also contemplated that a predetermined axial gap can be provided between the outlet face surface 100 of the first brick 70a and the inlet face surface 122 of the second brick 70b if such a configuration for the catalytic substrate assembly 110 is desired.

In one exemplary configuration, it is contemplated that the first brick 70a and the second brick 70b be identical in structure, but merely oriented in a reverse alignment such that flow channels 102 and 126 are clocked or indexed in opposite directions. Specifically, as the exhaust gas in the skewed flow channels 102 begins to follow a controlled rotated flow in a counterclockwise direction, a radical redirection of the original clocking direction will be created as the exhaust gas enters the inlets 128 of the flow channels 126 in the second brick 70b. It is optionally contemplated that the skewed profile of the flow channels 102 in the first brick 70a can differ from the skewed profile of the flow channels 126 in the second brick 70b. As such, the desired skewed profiles of the flow channels 102 and 126 can be engineered to generate desired turbulent flow conditions as required to improve catalytic efficiency and light-off characteristics of the catalytic converter 28'.

The catalytic converters of the present disclosure are not limited to use of only one or two substrate bricks having skewed flow channels and, as such, any combination of multiple bricks having aligned sets of flow channels (skewed and/or straight) are within the anticipated scope of this invention. Moreover, it is advantageous that the catalyst material can be loaded along specific target surfaces within the skewed flow channels to promote improved gas purification with a reduction in the required working amount of catalyst material. The non-laminar turbulent flow of the exhaust gases generated by the skewed flow channels acts to increase the mass transfer rate which, in turn, provides an increase in efficiency of the chemical catalyst.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A catalytic converter for purifying exhaust gas from an engine, comprising:
 a housing defining an inlet chamber for receiving the exhaust gas, a central internal chamber communicating with the inlet chamber, and an outlet chamber communicating with the central internal chamber for exhausting the purified gas; and a catalytic substrate disposed within said central chamber including:
  a first brick having a first face surface communicating with said inlet chamber, a second face surface, and a plurality of first flow channels therebetween; and
  a second brick separate from the first brick and having a first face surface in facing relationship to said second face surface of said first brick, a second face surface communicating with said outlet chamber, and a plurality of second flow channels therebetween;
wherein:
  said first flow channels and said second flow channels are aligned to provide fluid communication therebetween;
  said first flow channels and said second flow channels are non-linear and configured to define a flow path that extends continuously along a continuous arcuate path that rotates in only a single rotational direction throughout an entire length of the flow channels; and
  the first and the second flow channels together provide fluid communication between said inlet chamber and said outlet chamber.

2. The catalytic converter of claim 1 wherein said housing includes a shell defining said central chamber, an inlet end cone secured to one end of said shell to define said inlet chamber, and an outlet end cone secured to an opposite end of said shell to define said outlet chamber, wherein said inlet end cone has an inlet port for receiving the exhaust gas from the engine and said outlet end cone has an outlet port for exhausting the purified gas to a tail pipe, and wherein said catalytic substrate is an extruded ceramic material having its flow channels coated with a catalyst material.

3. The catalytic converter of claim 1 wherein each of said first flow channels has an inlet communicating with said inlet chamber and each one of said second flow channels has an outlet in communication with said outlet chamber, and wherein each one of said first and second flow channels is skewed and has an upstream end indexed relative to a downstream end in a range of 1° to 90° to define an arcuate profile.

4. The catalytic converter of claim 3 wherein said arcuate profile is continuous along an entire length of each of the first and second flow channels.

5. The catalytic converter of claim 3 wherein said arcuate profile is non-continuous and is defined by at least two distinct channel segments.

6. A catalytic converter for purifying exhaust gases from an engine, comprising:
  a housing having a shell, an inlet end cone extending from a first end of said shell, and an outlet end cone extending from a second end of said shell, said inlet end cone defining an inlet port for receiving the exhaust gas and an inlet chamber communicating with said inlet port, said shell defining a central chamber communicating with said inlet chamber, said outlet end cone defining an outlet chamber communicating with said central chamber and an outlet port for exhausting the purified gases; and
  a catalytic substrate disposed within said central chamber including:
    a first brick having a first face surface communicating with said inlet chamber, a second face surface, and a plurality of first flow channels therebetween; and
    a second brick separate from the first brick having a first face surface in facing relationship to said second face surface of said first brick, a second face surface communicating with said outlet chamber, and a plurality of second flow channels therebetween;
wherein:
  said first flow channels and said second flow channels are aligned to provide fluid communication therebetween;
  said first flow channels and said second flow channels are non-linear and configured to define a flow path that extends continuously along a continuous arcuate path that rotates in only a single rotational direction throughout an entire length of the flow channels; and
  the first and the second flow channels together provide fluid communication between said inlet chamber and said outlet chamber.

7. The catalytic converter of claim 6 wherein each of said first flow channels has an inlet communicating with said inlet chamber and each one of said second flow channels has an outlet in communication with said outlet chamber, and wherein each one of said first and second flow channels is skewed and has an upstream end indexed relative to a downstream end to define an arcuate profile.

8. The catalytic converter of claim 7 wherein said arcuate profile is continuous along an entire length of each of the first and second flow channels.

9. The catalytic converter of claim 7 wherein said arcuate profile is non-continuous and is defined by at least two distinct channel segments.

10. A catalytic converter for purifying exhaust gases from an engine, comprising:
  a housing having a shell, an inlet end cone extending from a first end of said shell, and an outlet end cone extending from a second end of said shell, said inlet end cone defining an inlet port for receiving the exhaust gas and an inlet chamber communicating with said inlet port, said shell defining a central chamber communicating with said inlet chamber, said outlet end cone defining an outlet chamber communicating with said central chamber and an outlet port for exhausting the purified gases; and
  a catalytic substrate disposed within said central chamber and including a first brick and a second brick separate from the first brick, said first brick having a first face surface communicating with said inlet chamber, a second face surface, and a plurality of first flow channels therebetween, said second brick having a first face surface in facing relationship to said second face surface of said first brick, a second face surface communicating with said outlet chamber, and a plurality of second flow channels therebetween;
wherein:
  said first flow channels communicate with said second flow channels; and
  said first flow channels and said second flow channels are non-linear and configured to define a flow path which extends continuously along a continuous arcuate path that rotates in only a single rotational direction throughout an entire length of the flow channels.

11. The catalytic converter of claim 10 wherein each of said first flow channels has an inlet communicating with said inlet chamber and an outlet, wherein each of said second flow channels has an inlet communicating with said outlet of said first flow channels and an outlet communicating with said outlet chamber, and wherein each of said first flow channels has its outlet indexed relative to its inlet to define a skewed flow path therebetween.

12. The catalytic converter of claim 11 wherein each of second flow channels has its outlet indexed relative to its inlet to define a skewed flow path therebetween.

13. The catalytic converter of claim 12 wherein said skewed flow path defined by said first flow channels is rotationally indexed to establish an arcuate profile.

14. The catalytic converter of claim 13 wherein said skewed flow path defined by said second flow channels is rotationally indexed to establish an arcuate profile.

15. The catalytic converter of claim 14 wherein said first flow channels are rotationally indexed in a clockwise direction and said second flow channels are rotationally indexed in a counterclockwise direction.

16. The catalytic converter of claim 10 wherein said first face surface of said second brick is in abutting engagement with said second face surface of said first brick, and wherein said outlet of said first flow channels are aligned to communicate with at least one of said inlets of said second flow channels.

17. A catalytic converter for purifying exhaust gas from an engine, comprising:
a housing defining an inlet chamber for receiving the exhaust gas, a central internal chamber communicating with the inlet chamber, and an outlet chamber communicating with the central internal chamber for exhausting the purified gas; and
a cylindrical catalytic substrate disposed within said central chamber, defining a central longitudinal axis and including:
a first brick having a first face surface communicating with said inlet chamber, a second face surface, and a plurality of first flow channels therebetween; and
a second brick separate from the first brick and having a first face surface in facing relationship to said second face surface of said first brick, a second face surface communicating with said outlet chamber, and a plurality of second flow channels therebetween;
wherein:
said first flow channels communicate with said second flow channels to provide fluid communication between the inlet chamber and the outlet chamber;
said first flow channels and said second flow channels are non-linear and aligned to define a flow path that extends continuously along a continuous arcuate path that rotates in only a single rotational direction throughout an entire length of the flow channels; and
each of said plurality of first and second flow channels being rotationally clocked continuously along a continuous arcuate path that rotates in only a single rotational direction throughout an entire length of the first and second flow channels around the central longitudinal axis to create turbulent flow of the exhaust gas flowing therethrough.

18. The catalytic converter of claim 17, wherein each of said plurality of flow channels is rationally clocked at least 1 degree around the central longitudinal axis.

19. The catalytic converter of claim 1, wherein:
the housing defines an axial centerline extending in a longitudinal direction of the housing;
the inlet chamber, the central internal chamber and the outlet chamber are aligned along the axial centerline; and
the continuous arcuate path continuously rotates around the axial centerline in only a single rotational direction throughout the entire length of the flow channel.

20. The catalytic converter of claim 6, wherein:
the housing defines an axial centerline extending in a longitudinal direction of the housing;
the inlet chamber, the central chamber and the outlet chamber are aligned along the axial centerline; and
the continuous arcuate path continuously rotates around the axial centerline in only a single rotational direction throughout the entire length of the flow channel.

21. The catalytic converter of claim 10, wherein:
the housing defines an axial centerline extending in a longitudinal direction of the housing;
the inlet chamber, the central chamber and the outlet chamber are aligned along the axial centerline; and
the continuous arcuate path continuously rotates around the axial centerline in only a single rotational direction throughout the entire length of the flow channel.

22. The catalytic converter of claim 17, wherein:
the housing defines an axial centerline extending in a longitudinal direction of the housing;
the inlet chamber, the central internal chamber and the outlet chamber are aligned along the axial centerline; and
the continuous arcuate path continuously rotates around the axial centerline in only a single rotational direction throughout the entire length of the flow channel.

23. The catalytic converter of claim 1, wherein the first brick is spaced apart from the second brick to define an air gap between the first and the second bricks and between the first and second flow channels.

24. The catalytic converter of claim 6, wherein the first brick is spaced apart from the second brick to define an air gap between the first and the second bricks and between the first and second flow channels.

25. The catalytic converter of claim 10, wherein the first brick is spaced apart from the second brick to define an air gap between the first and the second bricks and between the first and second flow channels.

26. The catalytic converter of claim 17, wherein the first brick is spaced apart from the second brick to define an air gap between the first and the second bricks and between the first and second flow channels.

* * * * *